United States Patent [19]
MacPherson

[11] Patent Number: 5,783,754
[45] Date of Patent: Jul. 21, 1998

[54] APPARATUS AND METHOD FOR MEASURING THE GRIPPING STRENGTH OF A VACUUM WAND

[75] Inventor: John MacPherson, Fremont, Calif.

[73] Assignee: Integrated Device Technology, Inc., Santa Clara, Calif.

[21] Appl. No.: 607,413

[22] Filed: Feb. 28, 1996

[51] Int. Cl.[6] ........................................ G01L 1/00
[52] U.S. Cl. ........................... 73/862.03; 73/862.541
[58] Field of Search ................ 73/862.03, 862.52, 73/862.53, 862.541, 1.15, 1.58, 826, 827, 1.08, 862.391, 862.392, 862.393, 865.9, 862.581

[56] References Cited

U.S. PATENT DOCUMENTS

| | | | |
|---|---|---|---|
| 1,260,869 | 3/1918 | Carlson | 73/862.01 |
| 1,296,932 | 3/1919 | Dodge | 73/862.01 |
| 3,718,039 | 2/1973 | Bacon et al. | 73/862.01 |
| 4,037,830 | 7/1977 | Poluzzi et al. | 269/21 |
| 4,050,729 | 9/1977 | Hutson | 294/64 R |
| 4,493,606 | 1/1985 | Foulke et al. | 414/787 |
| 4,530,635 | 7/1985 | Engelbrecht et al. | 414/627 |
| 4,559,718 | 12/1985 | Tadokoro | 34/8 |
| 4,620,738 | 11/1986 | Schwartz et al. | 294/64.1 |
| 4,682,928 | 7/1987 | Foulke et al. | 414/416 |
| 4,687,242 | 8/1987 | Van Rooy | 294/64.1 |
| 4,744,594 | 5/1988 | Poli et al. | 294/64.1 |
| 4,767,142 | 8/1988 | Takahashi et al. | 294/64.1 |
| 4,773,687 | 9/1988 | Bush et al. | 294/64.1 |
| 4,858,975 | 8/1989 | Ogawa | 294/64.1 |
| 4,960,298 | 10/1990 | Moroi | 294/64.1 |
| 4,983,093 | 1/1991 | Foulke et al. | 414/416 |
| 5,374,090 | 12/1994 | Goff | 294/64.1 |

*Primary Examiner*—Ronald L. Biegel
*Attorney, Agent, or Firm*—Skjerven, Morrill, MacPherson, Franklin & Friel

[57] ABSTRACT

An apparatus for measuring the gripping strength of a wafer holder, such as a vacuum wand or an automated robotic arm, is used to periodically test wafer holders during manufacture of wafers, and thereby eliminate the damage caused to wafers by worn wafer holders. The apparatus includes a hold tester to be held by the wafer holder and a gauge coupled to the hold tester that indicates the force applied by the wafer holder to the hold tester. The wafer holder is coupled to a predetermined region on the hold tester, and the wafer holder gauge is pulled away from the hold tester until the wafer holder becomes separated from the hold tester. The maximum force applied by the wafer holder on the hold tester is measured by the gauge and the above described process is repeated to obtain a second measurement of the force. If the difference in the two force measurements is less than a predetermined deviation, and if one of the two measured forces is below a predetermined gripping strength, the wafer holder is considered defective and a correction process is used to find and fix correctable defects. In the correction process, the defects can be corrected, for example, by replacing the wafer holder's tip, or checking the hold tester for abrasions.

24 Claims, 3 Drawing Sheets

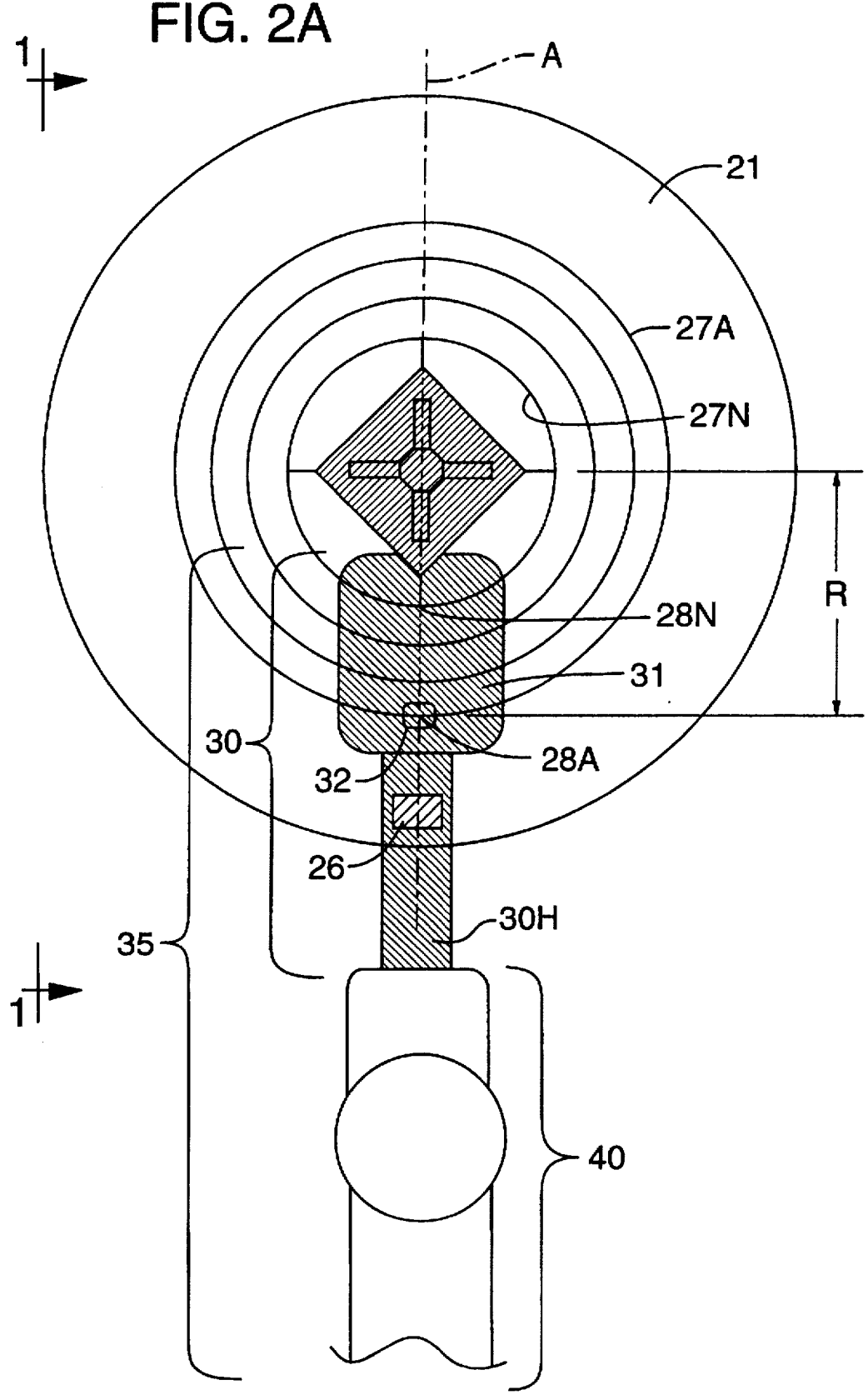

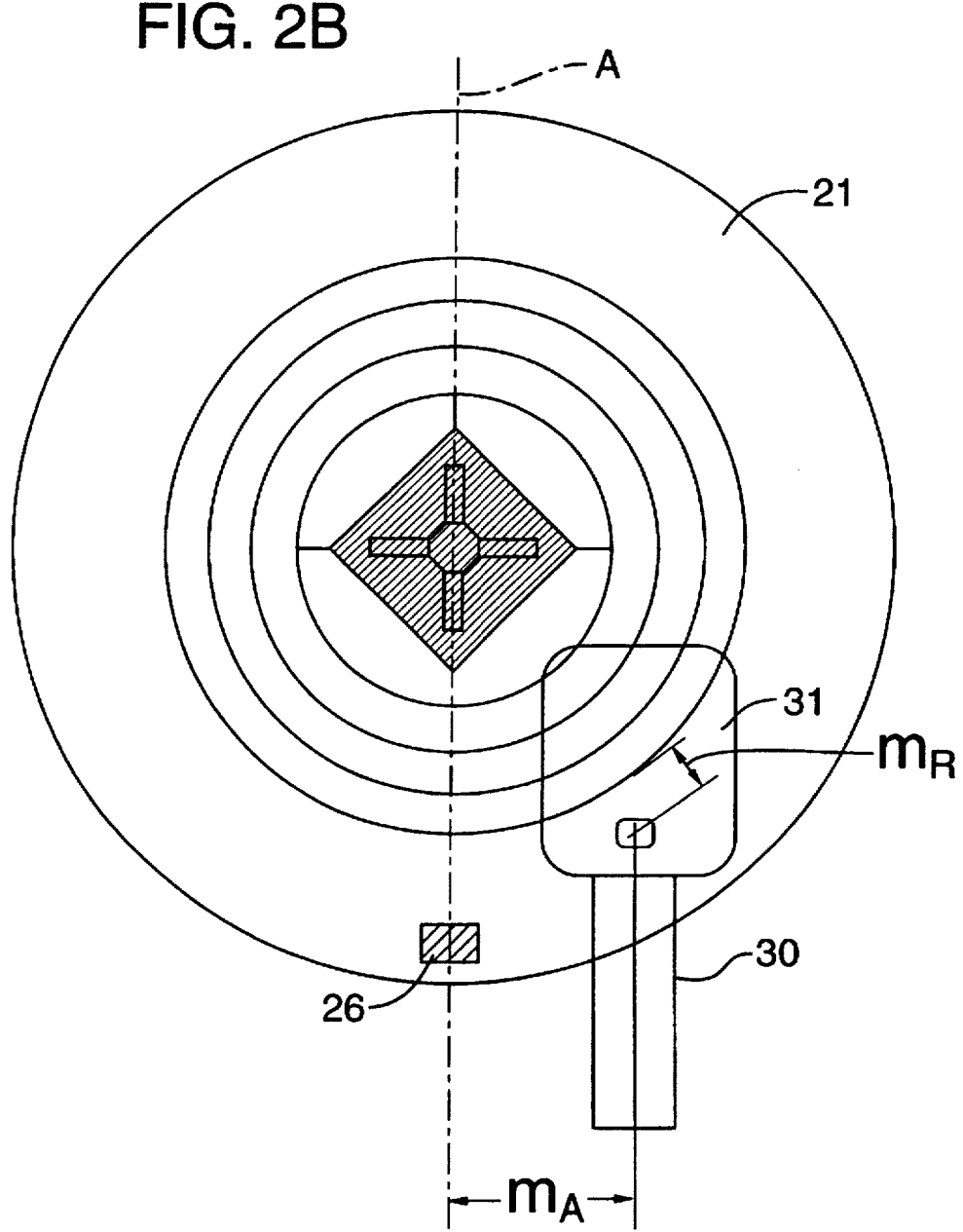

1

APPARATUS AND METHOD FOR MEASURING THE GRIPPING STRENGTH OF A VACUUM WAND

FIELD OF THE INVENTION

This invention generally relates to an apparatus and method for measuring the gripping strength of an object holder used to hold an object during the manufacture of the object. In particular, this invention relates to an apparatus and method for measuring the gripping strength of an automated handling system or a manual handling system, such as a vacuum wand, used in the manufacture of a semiconductor wafer.

BACKGROUND OF THE INVENTION

Integrated circuits are typically made by cutting dies from large crystals of semiconductor material called wafers. Wafers are substantially circular in shape and range in diameter from 4 to 12 inches. During the manufacture of integrated circuits, wafers are processed in a number of different machines, and are typically transported from one point to another using either a manual or automated handling system, such as a robotic arm. For example, wafer transfer by robotic arms is done with the utmost care within a "clean-room" facility to ensure that the wafers are kept as clean as possible.

A robotic arm is just one type of automated handling system that is an alternative to a manual system that uses a vacuum wand to hold a wafer. With repeated use, the vacuum wand or the robotic arm will wear out. Worn vacuum wands or automated handling systems can easily damage, for example by scratching or fracturing, a wafer. Such damage to a wafer may not be discernible until much later in the manufacturing process, after considerable time and effort has been invested. Moreover, scratches or fractures of a wafer typically result in silicon dust that can further contaminate the wafer.

SUMMARY OF THE INVENTION

In accordance with this invention, an object holder, such as a vacuum wand or a robotic transport arm, is tested periodically during manufacture of objects, such as wafers. Specifically, a wafer holder is tested by an apparatus for measuring the gripping strength of the wafer holder.

One embodiment of an apparatus for measuring the gripping strength of a wafer holder includes a hold tester and a gauge coupled to the hold tester. The hold tester has a predetermined region that is sufficiently flat and clean to allow the region to be held by the wafer holder. The gauge has a force transducer that measures, and a force indicator that indicates, the force applied by the wafer holder on the hold tester.

In a measurement process, the wafer holder is used to hold the hold tester in the predetermined region, and the force applied by the wafer holder is measured to determine a first force. Then in an optional step, the measurement is repeated to determine a second force. If the first and second forces differ from each other by more than a predetermined deviation (e.g. 5% of the first force), the measurement of the two forces is repeated.

If the first force is less than a predetermined gripping strength for holding a wafer, the wafer holder is determined to be defective and a correction process is performed. In the correction process, a wafer holder determined to be defective is checked for defects, for example, by visual inspection for scratches or abrasions in the region of the hold tester that is contacted by the wafer holder, for example, a region around a vacuum port of a vacuum wand. The pressure at a vacuum port can also be checked to ensure that a predetermined vacuum pressure is generated.

When the gripping strength of a number of wafer holders is measured, and a majority (i.e. more than 50%) of the wafer holders are found defective, the hold tester is checked for defects, such as scratches or abrasions in the predetermined region.

In this embodiment, the hold tester includes a centering disk and a tie wrap anchor affixed at the center of the centering disk by an adhesive. Also, in this embodiment, the gauge includes a coupling member, such as a hook, that is coupled to the tie wrap anchor and transmits a force applied by the wafer holder to the force transducer. The force transducer can be an analog transducer, such as a spring, and the force indicator can be an analog indicator, such as a handle that rotates around a dial. The force transducer indicates the maximum force applied on the hook. A reset switch included in the gauge resets the force indicator to a zero position indicative of a zero force applied on the force transducer.

In one specific embodiment, the centering disk of the hold tester is transparent and has a number of marks. The marks include an aligning mark for aligning the handle of a wafer holder with respect to the centering disk. The marks also include at least one radial mark at a predetermined distance from the center of the centering disk. The radial mark and the aligning mark together indicate a predetermined region for coupling to a holding region of a wafer holder.

An apparatus for measuring the gripping strength of a wafer holder as described herein is inexpensive and simple to operate. The apparatus allows wafer holders such as vacuum wands or a robotic transport arm to be periodically tested for wear during the manufacture of integrated circuits. Periodic testing of wafer holders virtually eliminates the damage to a wafer caused by worn wafer holders, and thereby provides significant savings in the cost of manufacturing wafers. The apparatus also allows the attributes of vacuum supply lines, such as size and pressure, to be validated. The apparatus can also be used for development of custom vacuum wands or vacuum based wafer transport mechanisms.

BRIEF DESCRIPTION OF THE DRAWINGS

FIGS. 2A and 2B illustrate, in plan views, an aligned position and a misaligned position respectively of a vacuum wand with respect to the centering disk illustrated in FIG. 1.

DETAILED DESCRIPTION

Figure 1:
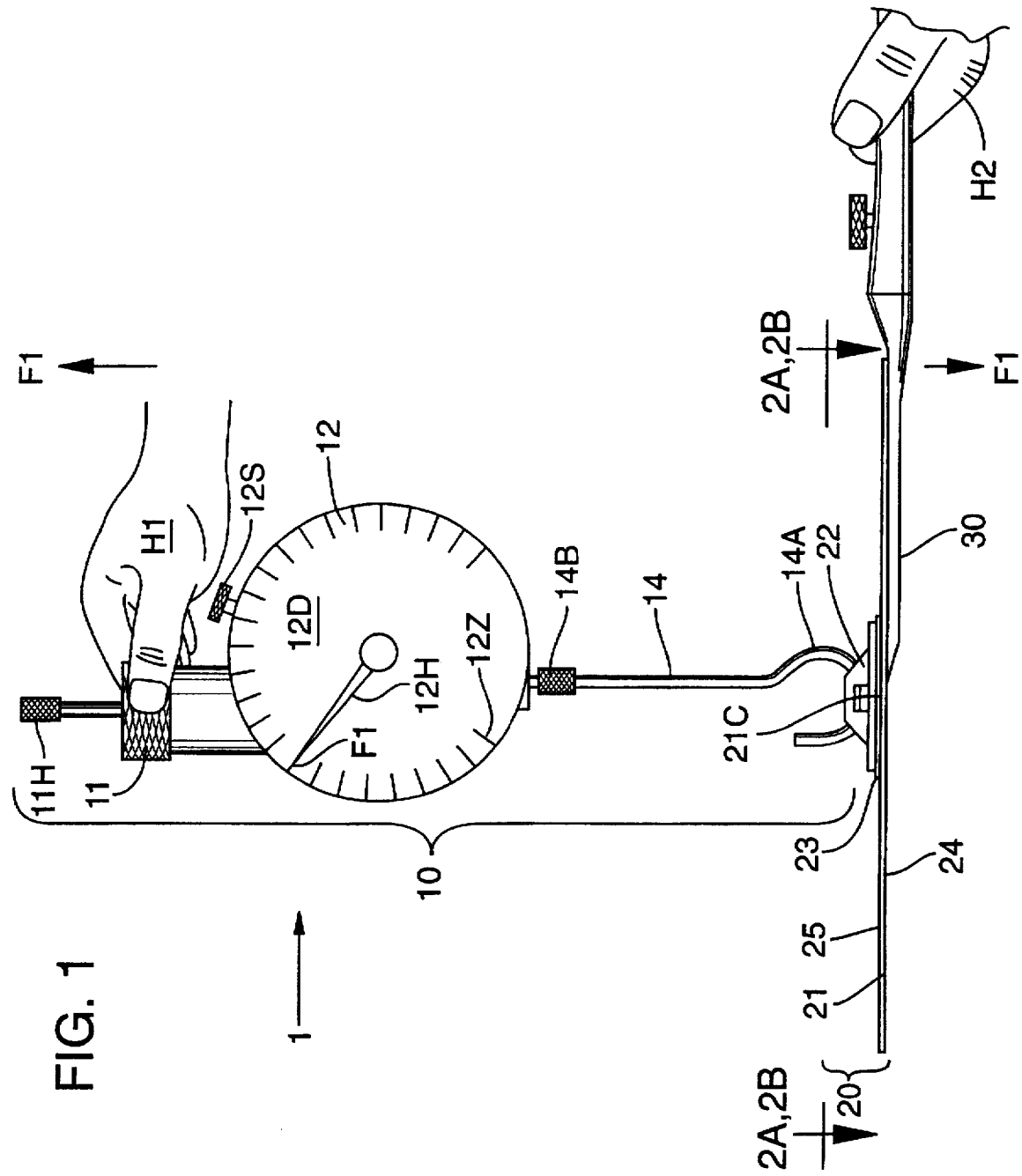
FIG. 1 illustrates a side view of an apparatus for measuring the gripping strength of a wafer holder in accordance with the present invention.

According to the principles of this invention, an object holder, such as a vacuum wand or a robotic transport arm, is tested periodically during manufacture of objects, such as wafers. A wafer holder can be visually inspected for marks of wear, such as scratches. The wafer holder can also be tested using an apparatus for measuring the gripping strength, as described below.

In one specific embodiment, an apparatus 1 (FIG. 1) for measuring gripping strength includes a gauge 10 and a hold tester 20. In this embodiment, hold tester 20 includes a centering disk 21, and a tie wrap anchor 22 that is affixed at a center 21C on support side 25 of centering disk 21 by an adhesive 23.

In this embodiment, centering disk 21 is transparent and has a number of radial marks 27A–27N (for clarity, not all N radial marks are labelled in FIG. 2A) formed on support side 25 (FIG. 1). A vertical line drawn through the center 21C defines an aligning axis A (FIG. 2A) along which a wafer holder, such as a vacuum tip 30, of vacuum wand 35 is to be aligned with respect to centering disk 21. In this embodiment, each of radial marks 27A–27N is a circle that intersects with axis A to indicate a different predetermined region 28A–28N at which a holding region, such as a vacuum port 32 of vacuum tip 30, is to contact centering disk 21. Hence, radial marks 27A–27N can be used to evaluate the performance of N different gripping strengths for wafers of N different sizes. Use of such radial marks results in repeatability in radial placement, and enhances the possibility of consistency in measurements. Aligning axis A is not marked on centering disk 21 in this particular embodiment.

In one particular embodiment, distances of radial marks 27A–27N from the center are 26.5 mm, 34.5 mm, 41.5 mm and 50 mm.

In this embodiment, gauge 10 (FIG. 1) includes a hook 14 that hooks into tie wrap anchor 22 at a first end 14A and is joined to force transducer 11 at a second end 14B. Force transducer 11 can be, for example, an analog force transducer that includes a spring, or a digital force transducer that includes a piezo electric crystal. Force transducer 11 is connected to a force indicator 12, that can be either a digital indicator or an analog indicator.

In one embodiment, force indicator 12 is an analog indicator that includes a dial 12D with a number of markings, e.g. marking 12Z, (for clarity, not all markings are labeled), a handle 12H that rotates around dial 12D to indicate the measured force, and a reset switch 12S for resetting handle 12H to a zero marking 12Z (indicating zero force).

In one variant of this embodiment, gauge 10 is a Wagner T53104 model FDK2 dynamometer, available from Davis Instruments, 4701 Mount Hope Drive, Baltimore, Md. 21215. Moreover, in this variant, centering disk 21 is a 150 mm centering disk 2-1-H-40011, available with radial marks formed by circular grooves and an aligning mark formed by the number "150.0" from Dai Nippon Screen, 3350 Scott Boulevard, Santa Clara, Calif. 95054.

During processing of wafers to manufacture integrated circuits, an operator periodically, for example every week, measures the gripping strength of the vacuum wands used by robots or humans to transport wafers from one point to another. Specifically, the operator initially presses a reset switch 12S on force indicator 12 to return handle 12H to zero marking 12Z. Then, based on the size of wafers for which a given vacuum wand or transport paddle is used, the operator positions the vacuum port 32 (FIG. 2A) of vacuum tip 30 with vacuum open on a predetermined region 28A on test side 24 (FIG. 1) of centering disk 21. The operator also positions the lower portion 30H of the wand tip 30 by aligning vacuum port 32 with center of centering disk 21C to form axis A.

In this embodiment, centering disk 21 is transparent and allows the operator to see through centering disk 21 from support side 25 while positioning tip 30 on test side 24 (FIG. 1). Errors from improper positioning of the vacuum tip 30 on disk 21 can be generated by either placing the vacuum tip 30 off axis A or by a radial misalignment. The two types of improper positioning of the vacuum tip 30 are illustrated in FIG. 2B by axial misalignment MA and radial misalignment MR. Therefore, proper positioning as illustrated in FIG. 2A is a critical aspect of this invention.

Once the vacuum tip 30 is properly positioned, the operator applies vacuum to vacuum tip 30 at its normal operating pressure, for example, 21 inches of mercury to form a vacuum seal between vacuum tip 30 and centering disk 31. Next, using a first hand H1, the operator holds a barrel 11, using a second hand H2 holds a handle 40 of vacuum wand 35, and slowly pulls on vacuum wand tip 30. While holding the centering disk in a stationary position, the operator continues to apply a pulling force between the barrel 11 and vacuum wand 35 until the vacuum seal is broken, causing the pocket region 31 of the vacuum tip to become separated from centering disk 21. At this point, handle 12H of force indicator 12 indicates, on dial 12D, a first force F1 that indicates the gripping strength of vacuum tip 30.

The operator optionally repeats all the above described steps to measure a second force F2. Specifically, the operator presses the reset switch 12S, positions vacuum port 32 on the same predetermined region 28A indicated by radial mark 27A and aligning mark 26, applies vacuum and measures a second force F2 (not shown in FIG. 1) on force indicator 12. The operator then checks if the force difference between first and second forces F1 and F2 is greater than a predetermined deviation, such as, 5% of first force F1, for example, 10 grams. If the force difference is greater than the predetermined deviation, there may be an error in the measurement process and so in the preferred embodiment the operator repeats the above described steps to again determine the first and second forces. Errors in the measurement process can occur, for example, if the operator pulls vacuum tip 30 very rapidly away from centering disk 21, or positions vacuum tip 30 improperly (FIG. 2B).

Next, the operator checks if first force F1 is below a predetermined gripping strength, for example, 200 grams. The predetermined gripping strength is an optimal gripping strength needed to safely hold a wafer, and can be calculated by a person skilled in the art of mechanical engineering. Alternatively, the predetermined gripping strength can be determined as an average of repeated measurements of the gripping strength of a number of identical wafer holders that are known to be functional.

If first force F1 is below the predetermined gripping strength, the operator decides that vacuum tip 30 is defective, and goes through a correction process.

In the correction process, the operator checks to see if a majority of the vacuum wands (in one particular embodiment all of the vacuum wands) are determined to be defective. If so, the operator reviews the measurement process described above, to see if any of the steps were missed or if a step was performed improperly. If all steps were followed properly, then the operator checks the predetermined region of centering disk 21 for scratches or abrasions.

If the operator is unable to find any defect in centering disk 21, the operator checks gauge 10 for any defects, for example, by recalibrating gauge 10.

If one or more of the vacuum wands is determined to be defective after the above steps, the operator replaces the vacuum tip 30 and then repeats the measurement process described above. If one of the forces F1 or F2 is still below the predetermined gripping strength, the operator replaces handle 40H of vacuum wand 35 and then again repeats the measurement process described above.

If the operator once again finds that the first force F1 is below the predetermined gripping strength, the operator replaces a hose (not shown) of vacuum wand 35 and then repeats the above described measurement process.

Table 1 (below) presents the results (average of F1 and F2) of testing a number of vacuum wands using the above described apparatus and method.

TABLE 1

SURVEY OF VACUUM WAND PULL STRENGTHS
Predetermined Gripping Strength is 200 grams.

| VACUUM WAND | READING (GRAMS) | DECISION (COMMENTS) |
|---|---|---|
| 1 | 270 | OPERATIONAL |
| 2 | 270 | OPERATIONAL |
| 3 | 230 | OPERATIONAL |
| 4 | 260 | OPERATIONAL |
| 5 | 230 | OPERATIONAL |
| 6 | 240 | OPERATIONAL |
| 7 | 170 | DEFECTIVE (shared vacuum supply) |
| 8 | 260 | OPERATIONAL |
| 9 | 360 | OPERATIONAL (obsolete wand) |
| 10 | 230 | OPERATIONAL |
| 11 | 230 | OPERATIONAL |
| 12 | 200 | OPERATIONAL |
| 13 | 170 | DEFECTIVE (poor design with small holding region) |
| 14 | 290 | OPERATIONAL |
| 15 | 240 | OPERATIONAL |
| 16 | 240 | OPERATIONAL |
| 17 | 260 | OPERATIONAL |
| 18 | 130 | DEFECTIVE (kink in vacuum hose at wall fitting) |
| 19 | 280 | OPERATIONAL |
| 20 | 190 | DEFECTIVE (kink in vacuum hose at wall fitting) |
| 21 | 370 | OPERATIONAL (obsolete wand) |
| 22 | <100 | DEFECTIVE (damaged wand tip-280 after replacement) |
| 23 | 210 | OPERATIONAL |
| 24 | 200 | OPERATIONAL |
| 25 | 230 | OPERATIONAL |
| 26 | 200 | OPERATIONAL |
| 27 | 230 | OPERATIONAL |
| 28 | 210 | OPERATIONAL |
| 29 | 230 | OPERATIONAL |
| 30 | 230 | OPERATIONAL |

The readings in TABLE 1 above were taken by an apparatus of the type illustrated in FIGS. 1 and 2A. Prior to the readings, isopropyl alcohol is used to clean the apparatus with clean room wipes. The procedure for cleaning the apparatus is in accordance with clean room rules known to a person of skill in view of the disclosure.

A Fluoroware flat-pak P/N 1493-60 was used to store the disk 21, and is available from Fluoroware, Inc., 102 Jonathan's Blvd, North Chaska, Minn. 55318.

Before performing any measurements, gauge 10 was calibrated by suspending gauge 10 vertically, attaching a calibration weight (not shown), for example between 250 and 750 grams, to hook 14 and checking that handle 12H indicates correct readings to within ±1%.

Periodic testing of vacuum wands and correcting defects in defective vacuum wands as described above virtually eliminates damage caused to a wafer by a vacuum wand of low gripping strength.

Various modifications and adaptations of the above described embodiments will be obvious to those skilled in the art in view of the enclosed disclosure.

Moreover, although in one embodiment, an analog force transducer, such as a spring, and an analog force indicator, such as a dial-and-handle are used, in another embodiment, a digital force transducer and a digital force indicator are used in a gauge. Although in the above described method, all vacuum wands are tested periodically, an operator can test a vacuum wand at any time that a vacuum wand is suspected to have a problem. Accordingly, although a specific vacuum wand has been described, any type of wafer holder capable of moving wafers, whether manual or automated, such as a transport arm e.g a robotic arm, can be tested by the method and apparatus of this invention.

Numerous modifications and adaptations of the above described embodiments are encompassed by the accompanying claims.

I claim:

1. An apparatus for measuring the gripping strength of a vacuum wand, said apparatus comprising:
   a hold tester wherein at least a majority of said hold tester is formed of a non-ferromagnetic material, and having a first side and a second side located opposite to said first side, said first side having a predetermined region that is sufficiently flat to be held by a vacuum wand; and
   a gauge coupled to said said second side of said hold tester, said gauge comprising a force transducer and a force indicator.

2. The apparatus of claim 1 wherein said force transducer measures tensile force and said gauge is coupled to said hold tester to supply a tensile force opposite to the force applied by said vacuum wand.

3. The apparatus of claim 1 wherein said hold tester comprises a centering disk.

4. The apparatus of claim 1 wherein said hold tester has a predetermined region indicated by said mark, said predetermined region being sufficiently flat and clean to allow said hold tester to be temporarily held by a vacuum wand on applying vacuum to said predetermined region.

5. The apparatus of claim 1 wherein the hold tester has a plurality of marks, at least one of said marks being a circle.

6. The apparatus of claim 1 wherein:
   the hold tester includes a centering disk and an anchor affixed at a center of said centering disk; and
   said gauge includes a hook, said hook having a first end and a second end, said first end being hooked into said anchor thereby to couple said gauge to said hold tester, said second end being joined to said force transducer.

7. An apparatus for measuring the gripping strength of a wafer holder, said apparatus comprising:
   a hold tester comprising a centering disk; and
   a gauge coupled to said hold tester, said gauge comprising a force transducer and a force indicator;
   wherein said centering disk is transparent.

8. The apparatus of claim 7 wherein said centering disk has at least a mark indicative of said predetermined region.

9. The apparatus of claim 8 wherein said centering disk has a radial mark and an aligning mark.

10. A method comprising:
   holding a hold tester using a wafer holder in a manner separable from said wafer holder;
   applying a force between said wafer holder and said hold tester until said hold tester becomes separated from said wafer holder; and
   measuring a first force applied between said wafer holder and said hold tester during said application of force.

11. The method of claim 10 further comprising:
   determining a gripping strength needed to hold said wafer; and
   comparing the first force to said gripping strength, to determine if said wafer holder is defective.

12. The method of claim 11 wherein said wafer holder is defective if said first force is less than said gripping strength.

13. The method of claim 10 further comprising:

resetting an indicator of the measured force;

repeating the steps a)–c) for said wafer holder to measure a second force;

determining a gripping strength needed to hold said wafer; and deciding whether the first force is less than a predetermined gripping strength for holding said wafer thereby indicating the presence of a defect.

14. The method of claim 13 further comprising repeating said steps a)–c) prior to deciding if the difference between the first force and the second force is greater than a predetermined deviation.

15. The method of claim 13 further comprising:

repeating steps a)–c) for each of a plurality of wafer holders.

16. The method of claim 15 wherein each wafer holder is a vacuum wand of a shape substantially similar to the shape of another vacuum wand in said plurality of wafer holders.

17. The method of claim 10 wherein:

during said holding, said wafer holder holds said hold tester in a predetermined region, and said method further comprises repeatedly performing said holding for each wafer holder in a similar predetermined region of said hold tester.

18. The method of claim 10 further comprising:

determining an optimal gripping strength for said wafer holder;

identifying a defect in said wafer holder after determining that the first force is less than said optimal gripping strength; and correcting said defect.

19. The method of claim 10 wherein said holding comprises applying vacuum to said wafer holder after said wafer holder is in contact with a predetermined region of said hold tester.

20. The method of claim 10 further comprising:

recording the first force and resetting an indicator of the first force; and repeating said holding, said applying, and said measuring for each of a plurality of wafer holders.

21. The method of claim 20 further comprising replacing said hold tester if the first force is less than the optimal gripping strength for a majority of said wafer holders.

22. The method of claim 10 wherein said first force is the maximum force applied during said step of applying a force.

23. The method of claim 10 wherein said wafer holder is pulled away from said hold tester during said step of applying a force.

24. The method of claim 10 further comprising calibrating a gauge used in said step of measuring prior to performing said measuring step.

* * * * *